D. V. KAUFMAN.
AIRPLANE.
APPLICATION FILED SEPT. 27, 1918.
1,335,690.
Patented Mar. 30, 1920.
2 SHEETS—SHEET 1.
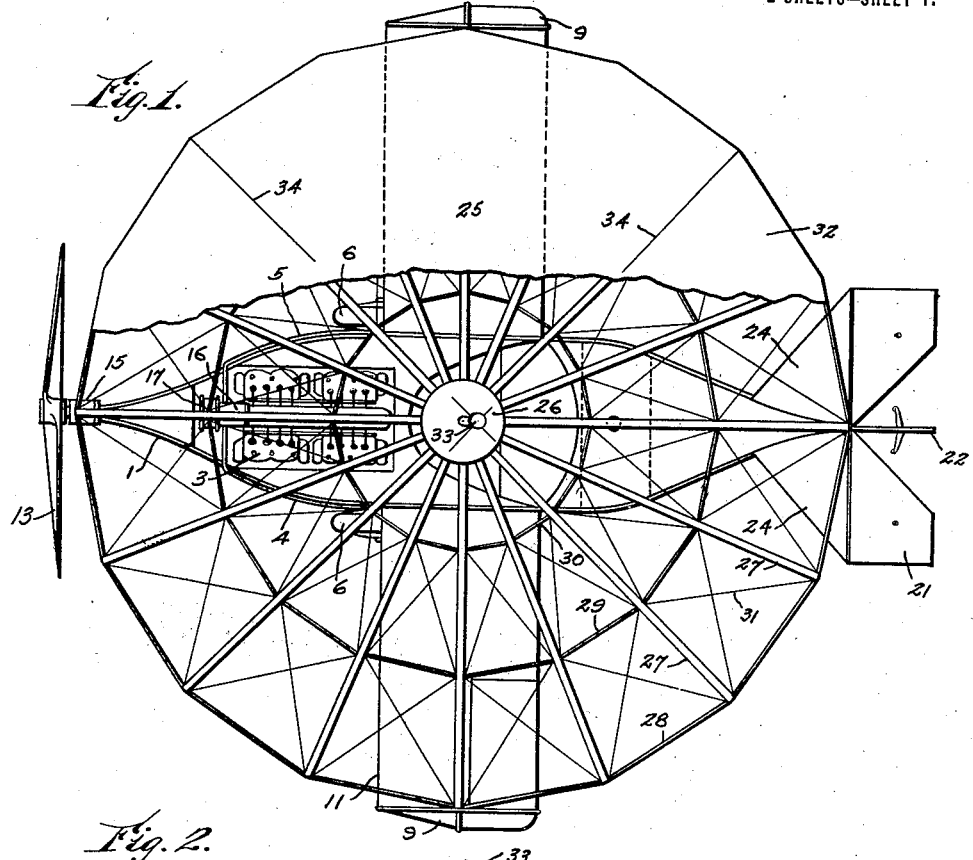
WITNESSES
INVENTOR
David V. Kaufman,
BY
ATTORNEYS

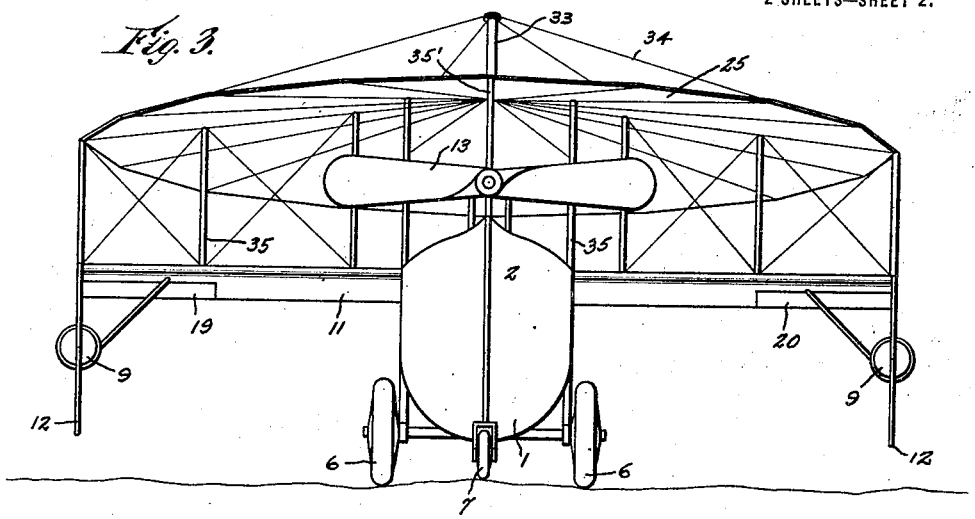
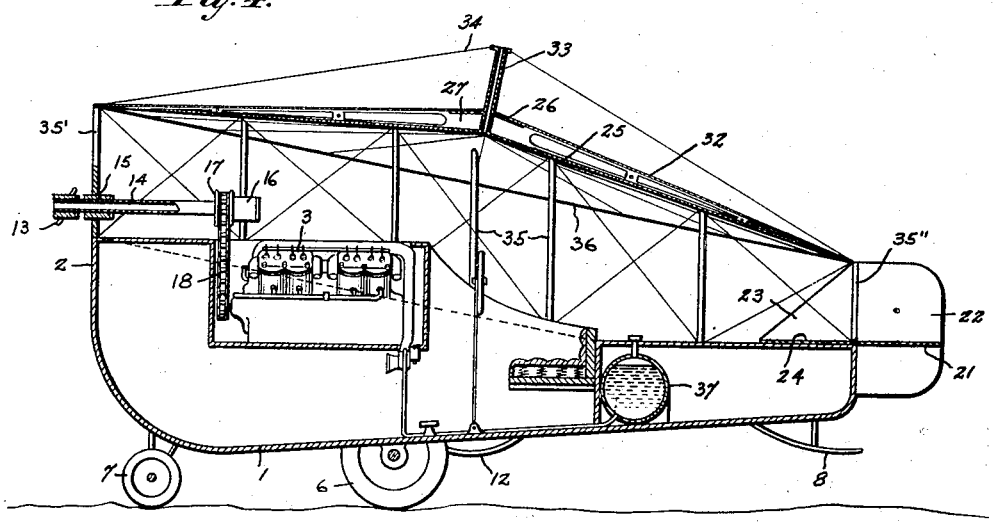

UNITED STATES PATENT OFFICE.

DAVID VARIUS KAUFMAN, OF NEW YORK, N. Y.

AIRPLANE.

1,335,690.  Specification of Letters Patent.  Patented Mar. 30, 1920.

Application filed September 27, 1918. Serial No. 255,890.

*To all whom it may concern:*

Be it known that I, DAVID V. KAUFMAN, a citizen of the United States, and a resident of the city of New York, borough of Manhattan, in the county and State of New York, have invented a new and Improved Airplane, of which the following is a full, clear, and exact description.

This invention relates to airplanes and has for an object the provision of an improved construction which will reduce to a minimum the danger involved in the use of a device of this kind.

Another object in view is to provide an airplane structure which will offer a minimum amount of resistance to the air and still present a maximum amount of supporting and elevating properties.

A still further object of the invention is to provide a construction which may be formed rigid and very strong so as to be maneuvered without any fear on the part of the pilot breaking any of the parts or losing control of the machine.

A still further object of the invention, more specifically, is the arrangement of a fuselage in the form of a stream line boat and an upper elevating plane in the form of a parachute arranged so that the fuselage may be connected to the front and rear parts of the upper elevating plane.

In the accompanying drawings:

Figure 1 is a top plan view of an airplane embodying the invention, certain parts of the covering of the upper plane being removed for better illustrating the construction.

Fig. 2 is a side view of the airplane shown in Fig. 1.

Fig. 3 is a front view of the airplane shown in Fig. 1.

Fig. 4 is a longitudinal vertical section through the airplane shown in Fig. 1.

Referring to the accompanying drawings by numerals 1 indicates the fuselage of an airplane, said fuselage being formed as a boat, constructed according to the stream line principles now in common use. The boat or fuselage 1 is provided with a high front or prow 2 in which is arranged the engine or motor 3 and which substantially covers the engine so that the air will slide over the surface of the body rather than through or over the engine and associate parts. The engine or motor 3 may be of any desired kind as for instance an ordinary internal combustion engine, said engine having an ordinary form of water jacket to which the radiators 4 and 5 are connected, said radiators being arranged exteriorly of the fuselage 1, but adjacent thereto so as to provide a proper cooling action without appreciably offering resistance to the air. A pair of traction wheels 6 are provided near the center of gravity of the entire device while a front wheel 7 is provided and a rear runner 8 is positioned at the rear of the fuselage for maintaining the airplane substantially on an even keel when on the ground. When riding on the water the fuselage or boat 1 will act as a proper support. In order to assist in keeping the airplane in a horizontal position a float pontoon 9 is provided on each side of the fuselage 1, said floats being supported by suitable supporting members 10 at the outer end of the lower lifting plane 11. A resilient bumper 12 is also arranged adjacent the outer end of the lifting plane 11. The bumpers 12 act to prevent the airplane from accidentally upsetting on the ground while the floats or pontoons 9 assist in holding the airplane in a substantially horizontal position when the boat or fuselage 1 is supported by water. When the airplane is either in the air, on land, or on the water the same is propelled by an air propeller 13 of the usual construction, said propeller being connected with a shaft 14 held in place by suitable bearings 15 and 16, bearing 16 acting as a thrust bearing for taking care of the pull of the propeller 13 and transmitting said pull to the fuselage and other parts of the airplane. Shaft 14 is provided with a sprocket wheel 17 which accommodates the chain 18, said chain also passing over a suitable sprocket wheel (not shown) connected with the engine or motor 3 whereby whenever said engine is operated power will be transmitted to the propeller. This form of transmitting power to the propeller is preferable, though other forms may be used. Chain 18 is preferably of the noiseless type and the sprocket wheels associated therewith are, of course, formed to properly receive said chain. It will be observed that the propeller is above the motor and substantially in line with the center of resistance when the airplane is passing through the air, so that a continuous pull of the propeller will act to hold the parts automatically in a substantially horizontal position and move the airplane forwardly according to the speed and power of the propeller.

The lower lifting plane 11 is of substantially the usual type now in common use and is formed according to the usual stream line principle, said lower lifting plane being provided with ailerons 19 and 20 for properly balancing the airplanes when in flight. In addition to the ailerons 19 and 20 an elevator 21 is provided at the rear of the fuselage 1 and also a rudder 22. These parts, namely the elevator and rudder are of the usual construction now in common use and are connected with operating mechanism of any desired kind, as for instance the ordinary lifting and steering mechanism now in common use. In front of the rudder 22 is a web or plane 23 which is rigidly fixed to the horizontal web or plane 24 which in turn is rigidly secured to the fuselage in any desired manner. This arrangement causes the air to flow in a straight line toward the elevator and rudder whereby these parts may act in a more efficient manner and provide a quick answer to the controlling mechanism.

Arranged above the plane 11 and the fuselage 1 is an upper lifting plane 25 which has the general form of a parachute, said upper lifting plane being formed with a central plate 26 as shown in Fig. 4 into which the ends of the ribs 27 are fitted and secured in any desired manner. The various ribs 27 are held properly spaced by stiff connecting members 28, 29 and 30. In addition to these stiff bracing members any desired number of guy wires 31 are used for tying the parts rigidly together so that there will be provided a rigid frame on which a covering 32 is positioned, said covering being fastened in any suitable manner, and formed of any desired material, as for instance canvas or silk. Connected with the plate 26 is a center post 33 whereby supporting wires 34 will properly act, said supporting wires being connected to post 33 and to the outer ends of some of the ribs 27. A number of struts 35 are connected to the various ribs 27 and to the lifting plane 11 as well as to the fuselage 1. One or more struts 35' are connected to the upper plane 25 and to the front of the fuselage 1, and one or more struts 35" are used to connect the rear end of the fuselage 1 with the rear part of the upper plane 25 whereby said upper plane is not only constructed so as to be a rigid structure, but is rigidly secured to the lower plane 11 and to the fuselage 1.

In Fig. 4 it will be seen that the upper plane 25 is shaped somewhat in the nature of a parachute, but is rigid throughout. The bottom edge 36 is inclined, descending in a straight line from the top end of the strut 35' to the top end of the strut 35". As the airplane moves through the air, the air will strike against the rear part of the upper plane and also the lower plane for producing a proper sustaining effect when traveling in a horizontal direction. When traveling upwardly the entire airplane is tilted so that the front part of the upper plane will operate as a lifting plane as well as the rear part. In fact the front part acts continually to a greater or less extent as a lifting plane though to a greater extent when the airplane is moving upwardly at a considerable angle. As the air passes beneath the upper plane it is deflected so as to pass on each side of the web 23 and above the horizontal web 24 so that there will be a strong air pressure against which the elevator and rudder may act whenever desired for producing an elevating or depressing effect or for moving to the right or left.

As shown in Fig. 4 the engine is arranged slightly in front of the center of the machine while the seat is arranged slightly in back of the center of the machine as well as the fuel supply 37. Ample space is supplied in the fuselage 1 for storing supplies and if desired for carrying extra passengers. It will, of course, be understod that the engine or motor 3 must be positioned either forwardly or centrally according to the distribution of the remaining part of the load carried by the lifting planes.

The parachute lifting plane and the boat shaped fuselage are positioned so as to act as a lifting plane and fuselage respectively when in the air under ordinary conditions, but in case of accident, as for instance when the engine is stalled or stops running the upper plane will automatically right itself and act as a parachute for allowing a gradual descent to the ground without fear of collapse. The fuselage ordinarily acts as an ordinary fuselage now in common use while in the air, or on the ground, but in case of lighting on the water it will act as a boat for not only supporting and saving the lives of the occupants, but as a support for the complete airplane.

What I claim is:

1. An airplane of the character described comprising a fuselage, a parachute-shaped lifting plane connected with the fuselage but spaced therefrom, said plane extending rearwardly and downwardly with the lower edge at an angle to the horizontal, said plane extending from the front of the fuselage to the rear thereof, a vertically arranged fin at the rear of the fuselage extending from the rear toward the front beneath the lifting plane, a horizontally arranged fin positioned below the vertically arranged fin whereby the air deflected by the lifting plane will move in a rapid stream from beneath the rear of the lifting plane, an elevator and rudder means arranged immediately in the rear of the fuselage whereby they are in a position to act on said stream of air for producing quick manipulation of the airplane, and propelling means arranged adjacent the front of the fuselage.

2. In an airplane of the character described, a boat shaped fuselage, a parachute shaped upper lifting plane connected with the fuselage, a lower lifting plane connected with said fuselage spaced from the upper plane, the front and rear of the upper plane being on a line with the front and rear ends of the fuselage, a pontoon or float connected with the opposite ends of the lower lifting plane, propelling means carried by the fuselage adjacent the front, and steering and elevating means carried by the fuselage near the rear.

DAVID VARIUS KAUFMAN.